Patented Nov. 20, 1951

2,576,002

UNITED STATES PATENT OFFICE 2,576,002

DIPYRIDINIUM COMPOUND

Melvin De Groote, University City, and Bernhard Keiser, Webster Groves, Mo., assignors to Petrolite Corporation, Ltd., Wilmington, Del., a corporation of Delaware No Drawing. Original application April 2, 1945, Serial No. 586,265. Divided and this application November 26, 1945, Serial No. 630,972

1 Claim. (Cl. 260—295)

This invention relates to a new chemical compound or product, and to the manufacture of same, our present application being a division of our pending application Serial No. 586,265, filed April 2, 1945, now Patent No. 2,429,999.

One object of our invention is to provide a new material or composition of matter, that is particularly adapted for use as a demulsifier in the resolution of crude oil emulsions, but which is also capable of use for various other purposes, or in various other arts.

Another object of our invention is to provide a practicable method for manufacturing or producing the new material or composition of matter above referred to.

The new material or composition of matter herein described, consists of a diquaternary compound, particularly a dipyridinium compound of a dimerized polyene fatty acid containing two amido radicals, and the pyridinium radicals are linked with the acyl radical of the dimerized acids in the manner hereinafter described.

The following will describe one simple aspect of the present invention and will serve to illustrate the type of compound contemplated. If the dimerized fatty acid hereinafter described is indicated by:

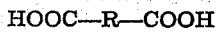

then such product can be converted into a hydroxylated diamide by reaction with two moles of monoethanolamine, or two moles of diethanolamine, or by reaction with ammonia and subsequent oxyethylation to yield a compound of the following composition:

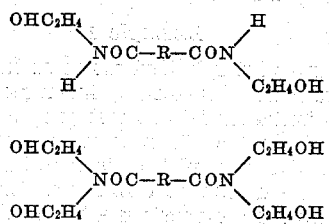

Such compound can then be reacted with one or two moles of a pyridine hydrohalide, for instance, pyridine hydrochloride, so as to yield a compound of the following composition:

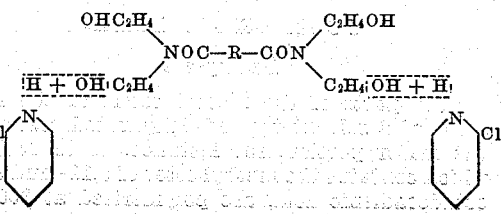

Such dipyridinium compound of the quaternary type exemplifies one example of the type of compound herein contemplated.

The dicarboxy acids herein contemplated as reactants, or their equivalent, such as their ethyl or methyl esters, are obtained by the polymerization, and principally, the dimerization of esters of unsaturated fatty acids, particularly conjugated diethylenic acids. Such dimerized acids or their esters are well known compositions and have been used for various purposes, such as the manufacture of a resinous or synthetic coating material obtained by reaction between such dimerized compounds and certain diamines. (See Oil and Soap, volume 21, No. 4, page 101.)

The chemistry of polymerization has been discussed in the literature, but for convenience, reference is made to U. S. Patent No. 2,347,562, dated April 25, 1944, to Johnston, where the following appears:

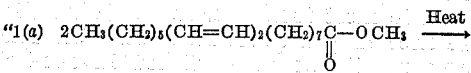

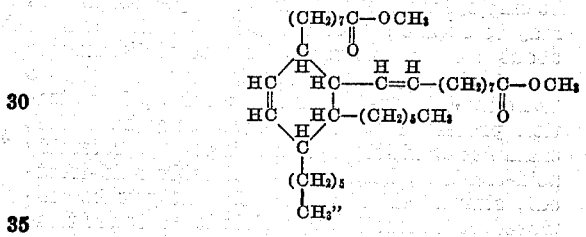

As to the preparation of such polymerized acids or esters, it is to be noted that any polyene fatty acid or its ester may be employed as a raw material. In fact, one may use a mixture, such as one which occurs naturally in various drying oils. The most important of these are the octadecadienic or octadecatrienic fatty acids or their esters, but the polymeric fatty acids containing 20, 22 and 24 carbon atoms found in fish oils are also suitable.

Examples of the polyene fatty acids, the esters of which are polymerized, are the following: 9,11- and/or 9/12-octadecadienic acids (obtainable from perilla oil, linseed oil and other drying oils) both alpha- and beta-eleostearic acids (obtainable from tung oil), etc.

If esters of the polyene fatty acids be employed, such esters may be produced by direct esterification of the fatty acids with the alcohol which has been selected, but it is generally more economical and more convenient to produce the esters by mixing the alcohol with a natural drying oil, together with a trace of alkali hydroxide, hydrogen chloride, or other esterification catalyst, and thereby effect an alcoholysis or ester interchange by simply heating.

Ordinarily speaking, polymerization is conducted so as to obtain comparatively high conversion from the monomeric state to the polymeric state, even though some polymers higher than the dimeric state may be produced, for instance, trimers or tetramers. If desired, such polymers can be separated from each other, insofar that the dimers can be separated from the higher polymers, such as the trimers or tetramers. The method employed involves selective solvent action, but does not require further description, for the reason that there is no objection to the moderate presence of higher polymers along with the dimers herein contemplated for reaction, and if polymerization is conducted under comparatively mild conditions, so as to polymerize not over 50% of the polyene acid esters, then and in that event, the product obtained is principally the dimeric product. In any event, this is immaterial, for the reason that the dimeric products either in the form of the ethyl or methyl ester or the acids themselves, may be purchased in the open market at the present time.

It may be well, however, to indicate briefly the general conditions of polymerization. If methyl or ethyl esters of the polyene acids be utilized, it has been found that temperatures between about 250° C. and about 350° C. are suitable for the polymerization. The time required for this polymerization varies, not only with the temperature, but with the acid and the particular ester which is used. Generally, a period of from about one-half an hour to about 50 hours is suitable, and in most instances, the polymerization may be effected in not over 12 hours. Dimerization can usually be accomplished in one-half this period of time. If a conjugated unsaturated ester, such as the methyl ester of eleostearic acid be employed, a sufficient degree of polymerization may be obtained within one-half to one hour at about 300° C., whereas, the methyl linolenates and linoleate generally require from about 5 to 12 hours, or more. To speed up the polymerization process, suitable catalysts may be added, examples of which are: fuller's earth (preferably acid-treated), bentonite (preferably acid-treated), stannic chloride, etc. If catalysts be employed, it is sometimes possible to use lower temperatures and shorter periods of time, or shorter periods of time, than those indicated above.

In general, it is preferred to conduct the polymerization in an inert atmosphere of carbon dioxide, nitrogen or other inert gas. The polymerization is preferably continued until the refractive index, density and average molecular weight approach constant value. At this point, the polymerized esters are separated from the unpolymerized esters by any suitable method. In subsequent examples, there is suggested the separation of these esters by distilling off the unpolymerized esters at an absolute pressure of about 1-5 mm. of mercury, and at temperatures up to about 300° C. Another way in which this separation may be effected is by extraction with methanol or other suitable solvent. Generally, the result of polymerizing yields about 30% to 75% of the polymeric esters. As indicated previously, if the reaction is conducted so as to obtain mild polymerization and less than 50% of the product to the polymeric state, it will be found the bulk, if not all, are readily obtainable in the dimeric state.

Previous attention has been directed to the fact that the esters of any polyene higher fatty acid may be employed or mixtures thereof. Polymerization of the kind indicated is concerned largely with conjugated polyene structure. Previous reference has been made to such acid esters as show such structure. However, the fact that any polyene ester may be employed as a raw material for the manufacture of the herein contemplated reactants, is due to the fact that such materials can be isomerized to the conjugated structure. It is well known that alkali metal hydroxides act on conjugated fatty acids and oils in either aqueous or alcoholic solutions. Procedures are available which enable the conversion of 30% to 50% of conjugated acids from soyabean and linseed oils. (See Industrial and Engineering Chemistry, volume 34, page 237, and U. S. Patent No. 2,350,583, dated June 6, 1944, to Bradley.) Thus, the raw materials herein contemplated include, among others, the isomerized fatty acids or esters obtained from unsaturated higher fatty acids having at least two non-conjugated double bonds. Such materials are obtainable, for example, from linssed oil, soyabean oil, perilla oil, poppyseed oil, cottonseed oil, sunflowerseed oil, and a number of fish oils. The fatty acids, prior to isomerization, generally have an iodine number of 110, or substantially higher.

A further description of polymeric fatty acids and their compounds is found in U. S. Patent No. 2,357,839, dated September 12, 1944, to Manley and Evans. Note that in said patent such acid is referred to as a "polymeric fat acid." By analogy, the dimeric acid would be referred to as "dimeric fat acid."

From a practical standpoint, two other facts are of marked interest. There is now available a solvent-treated dehydrated castor oil or fatty acid derivative, in which the 9,11 isomer is present to the extent of approximately 85%. This commercial product is particularly desirable as a reactant for preparation of herein contemplated compounds. Another factor of interest is recognition of the effectiveness of certain catalysts in converting non-conjugated unsaturated fatty oils or acids, so as to result in the conjugated isomer. For instance, see Oil and Soap, volume 21, No. 11, page 329.

POLYMERIZED ESTER

Example 1

800 parts of the methyl esters of tung oil fatty acids are heated, preferably in an atmosphere of carbon dioxide or other inert gas, to a temperature of about 275° C. in approximately 40 minutes and the temperature is maintained at this point for about one-half an hour. The relatively volatile and unpolymerized esters are removed by distillation at about 1-5 mm. of mercury absolute pressure, the temperature being gradually raised to about 300° C., leaving a residue containing 365-380 parts of non-volatile polymerized esters.

POLYMERIZED ESTER

Example 2

1,000 parts of the methyl esters of the fatty acids of a solvent-treated dehydrated castor oil, the major portion, for instance, 80 to 85%, of which contains the methyl ester of 9,11- and 9,12-octadecadienic acid, are polymerized at 300° C.

for about 3 hours in an inert atmosphere. The volatile and unpolymerized esters are removed by distillation at 1-5 mm. of mercury absolute pressure, the temperature being gradually raised to about 300° C., leaving as a residue about 450-460 parts of non-volatile polymerized esters.

POLYMERIZED ESTER

*Example 3*

2,000 parts of the methyl esters of the fatty acids of soyabean oil are mixed with 200 parts of activated bentonite ("Super-Filtrol") and the mixture is heated, preferably in an inert atmosphere at about 280° C. for about one-half hour. The product is filtered and the volatile and unpolymerized esters are removed by distillation at 1-5 mm. of mercury absolute pressure, the temperature being gradually raised to about 300° C., leaving as a residue about 833-840 parts of polymerized esters.

In numerous acylation reactions, the acyl radical can be introduced by means of various reactants, for example, the acid itself or the ester thereof, particularly a low molal ester. Thus, if the use of the acid results in the elimination of water as a volatile resultant, similarly the use of the methyl or ethyl ester will result in the elimination of methyl or ethyl alcohol. Thus, either the dimeric acid itself, or the ester, may be employed in the following reactions. The acid is readily obtainable by saponification of the ester, followed by acidification.

As has been previously indicated, hydroxylated amides containing the amido linkage which results in substantial elimination of the amino nitrogen atom and a high molal acyl radical, will react with a pyridine hydrohalide or its equivalent to give a quaternary compound. The high molal acyl radical may be present directly linked to the amino nitrogen atom, i. e., in amido form, or may be present as an ester-linked radical. In the latter event the amido radical present must be that of a low molal carboxy acid, for instance, one having 7 carbon atoms or less, such as acetic acid, butyric acid, etc.

The reactions of the kind referred to are well known in connection with high molal monocarboxy acids, in which instance they result in the formation of a mono (quaternary) compound.

Another procedure depends on the reaction of the amide with formaldehyde or paraformaldehyde, so as to yield the hydroxymetal amide. The reaction involved may be indicated in the following manner:

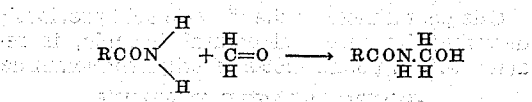

See U. S. Patent No. 2,146,392, dated February 7, 1939, to Baldwin and Walker.

Another reaction involves the formation of the ethanol or diethanolamide, or comparable compound, as described previously. Other suitable reactants include products obtained by treating the unsubstituted amide with various oxyethylated agents, such as ethylene oxide, propylene oxide, butylene oxide, glycide or methylglycide, or else forming the comparable amide by reaction with mono- or diethanolamine, mono- or dipropanolamine, mono- or dibutanolamine, or with amines such as ethyl ethanolamine, benzyl ethanolamine, cyclohexyl ethanolamine, phenyl ethanolamine, or the like. See U. S. Patent No. 2,329,700, dated September 21, 1943, to De Groote and Keiser.

It is to be noted that if the amide indicated as

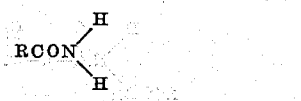

is reacted with a plurality of ethylene oxide or equivalent, for instance, 4 moles, then the hydroxyalkyl radicals are interrupted by an oxygen atom, which may be indicated in the following manner:

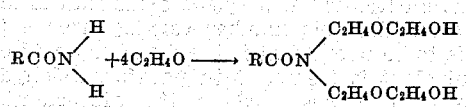

Such oxygen atom interruption of the carbon atom chain does not detract from the activity of the hydroxyl group, and thus, any reference to an alkylene radical or hydroxyalkyl radical includes such radicals in which such interruption takes place. See U. S. Patent No. 2,329,702, dated September 21, 1943, to De Groote and Keiser.

Other comparable derivatives are obtained from such compounds as 2-amino-1-butanol, 2-amino-2-methyl-1-propanol, 2-amino - 2 - methyl - 1,3-propanediol, 2-amino - 2 - ethyl-1,3-propanediol and tris(hydroxymethyl)aminomethane. See U. S. Patent No. 2,329,701, dated September 21, 1943, to De Groote and Keiser.

As to the type of reactant where a low molal acid such as acetic acid, propionic acid, butyric acid, valeric acid, hydroxyacetic acid, lactic acid or the like, furnishes the acyl radical which becomes part of the amido radical and in which the high molal acyl radical, such as a higher fatty acid radical, is present in ester form, see U. S. Patent No. 2,335,262, dated November 30, 1943, to De Groote and Keiser.

It has been pointed out that the herein contemplated compounds are derivatives of certain high molal dimeric acids previously indicated in their simplest form as:

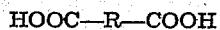

One specific example of such acids is the following:

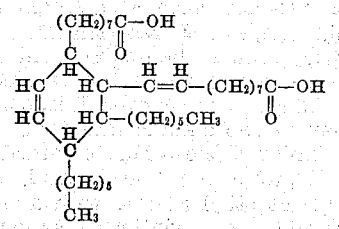

Polycarboxy acids, and particularly dicarboxy acids, may be reacted in the conventional manner with the same conventional reactants as monocarboxy acids, or monocarboxy esters, so as to give dipyridinium compounds which bear a simple genetic relationship to the monopyridinium compounds previously described.

Such procedures may be illustrated in the following manner. Reaction of such dicarboxy acids or esters with ammonia yield the amides of the following structures:

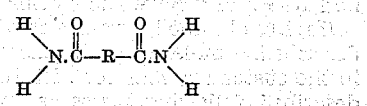

Such amides may be treated with 2, 4, 6, 8 or more moles of ethylene oxide, propylene oxide, butylene oxide, glycide or the like to yield compounds of the following structures:

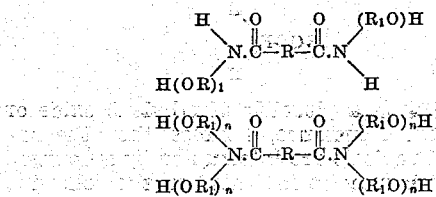

wherein $R_1O$ is the alkylene oxide radical and $n$ is a small whole number varying from 1 to 5. It is to be noted that if the dicarboxy acid or its equivalent is treated with paraformaldehyde in the manner described in the aforementioned U. S. Patent No. 2,146,392, then in such instance, the radical $R_1$ directly attached to the amido nitrogen atom, may be a methylene radical, but in all other occurrences, $R_1$ represents the ethylene oxide radical, the propylene oxide radical, the butylene oxide radical, the glycide radical or methylglycide radical.

Diamides of the kind described may, of course, be obtained by reaction with the dicarboxy acid, its ester or some other equivalent, with various amines, such as monoethanolamine, diethanolamine, monopropanolamine, dipropanolamine, ethyl ethanolamine, benzylethanolamine, etc. The amine so obtained can be subjected to oxyalkylation just as if such compounds had been derived initially by the action of an alkylene oxide.

In the above intermediates it is to be noted that the high molal acid or its equivalent contributes the amide radical which must be present in each instance. It has been pointed out that the amide radical may be present in such a form or structure that the acyl radical of the amido linkage is furnished by the acyl radical of a low molal carboxy acid, such as acetic acid, propionic acid, etc., but in any event, limited to low molal carboxy acids having 7 carbon atoms or less. For instance, acetic acid, butyric acid, or the like, can be reacted with any suitable primary amine having an alkanol radical, such as monoethanolamine, monopropanolamine, monobutanolamine, or the like, or with any secondary amine having two such radicals, such as diethanolamine, dipropanolamine, etc. If reaction takes place with the primary amine, then subsequent to amidification, such product must be reacted with an alkylene oxide so as to convert it into a secondary amine having two alkanol radicals or the equivalent. Similarly, the amide obtained by reacting the acid, for example, acetic acid, or its equivalent, such as ethyl acetate with ammonia, can be subjected to oxyalkylation, so as to produce an equivalent reactant. Such procedures are described in the aforementioned U. S. Patent No. 2,335,262. In any event, the result of such procedure is to yield a reagent of the structure

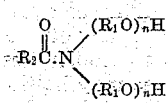

in which $R_2CO$ is the acyl radical of a low molal monocarboxy acid having 7 carbon atoms or less, and $R_1O$ and $n$ have their prior significance.

Having obtained a reactant of the kind above described, 2 moles of such reactant are esterified in the customary manner with the reactants thus described, following the same procedure in every respect, as described in the aforementioned U. S. Patent No. 2,335,262, using, of course, 2 moles of the hydroxylated ester amide for each mole of the dicarboxy acid or its equivalent. The reaction may be indicated in the following manner:

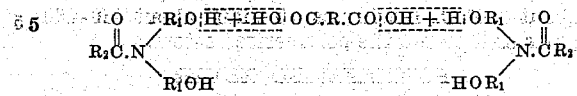

In the above reaction no attempt is made to show that the occurrence of $R_1O$ may be repetitious, although obviously, such a repetition may appear, as indicated by $n$ in the structural formula of the reactant previously depicted.

The reactants previously described for combination with pyridine hydrochloride or the equivalent, may be summarized by the following formulae:

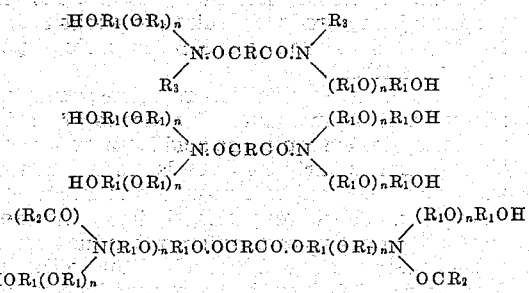

In the above formulae $R_3$ represents a hydrocarbon radical containing not over 7 carbon atoms and derived, for example, from benzylamine, cyclohexylamine, aniline, hexylamine, amylamine, butylamine, or the like. Similarly, $R_3$ may be a hydrogen atom, as, for example, when monoethanolamine, monopropanolamine, monobutanolamine, or the like, are employed, or when the unsubstituted diamide is treated with two moles of ethylene oxide, or two moles of propylene oxide, or two moles of butylene oxide. The value of $n$ has been changed so as to vary from 0 to 4, in order to show that there must always be one hydroxyl radical, as part of each amide radical, and show that the total variation of repetitious ether linkages remains the same as before.

In order to illustrate the above types further, the following examples are included. In each instance reference to the dimeric acid is intended to be the particular dimeric acid shown in the detailed structure by a previous formula.

HYDROXYLATED DIAMIDE

*Example 1*

One pound mole of the dimeric acid previously described by actual structural formula, is reacted with 2 pound moles of ethylethanolamine.

HYDROXYLATED DIAMIDE

*Example 2*

Amyl propanolamine is substituted for ethylethanolamine in the previous example.

HYDROXYLATED DIAMIDE

*Example 3*

The two amine reactants previously described in Examples 1 and 2, are treated with 2, 4 and 6 pound moles of ethylene oxide in the conventional manner.

HYDROXYLATED DIAMIDE

*Example 4*

Butylene oxide is substituted for ethylene oxide in the previous example.

HYDROXYLATED DIAMIDE

Example 5

The dimeric acid previously described is reacted with ammonia so as to produce the diamide. The one pound mole of the diamide is reacted with 2 pound moles, 4 pound moles, 6 pound moles, 8 pound moles, or 10 pound moles of ethylene oxide. Similarly, propylene oxide or butylene oxide may be substituted for ethylene oxide.

HYDROXYLATED DIAMIDE

Example 6

One pound mole of dimeric acid, previously described, is reacted with 2 pound moles of diethanolamine or 2 pound moles of dipropanolamine. The product so obtained may be reacted further with ethylene oxide, propylene oxide, or the like. It is to be noted that such products are identical with those obtained by treating the diamide with the corresponding alkylene oxide.

HYDROXYLATED DIAMIDE

Example 7

2 pound moles of diethanolamine are reacted with 2 pound moles of acetic acid, or else 2 moles of acetamide are treated with 4 pound moles of ethylene oxide, so as to yield 2 pound moles of the compound of the following composition:

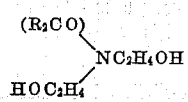

wherein RCO is the acyl radical. 2 pound moles of such hydroxylated amide are reacted with 1 pound mole of the dimeric acid previously described, so as to produce a reactant of the type last mentioned in the previous summary.

HYDROXYLATED DIAMIDE

Example 8

In the immediately previous example, the compound of the structure

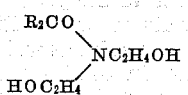

is treated with 2 or 4 moles of ethylene, propylene, or butylene oxide prior to reaction with the dimeric acid.

HYDROXYLATED DIAMIDE

Example 9

The same procedure is followed as in the immediately preceding Example 8, except that the butyric acid or lactic acid derivative or hydroxyacetic acid derivative, is employed instead of the acetic acid derivative.

Part of the previous examples indicate one obvious aspect of the compounds herein contemplated. If in the last example hydroxyacetic acid or lactic acid had been employed instead of the acetic acid derivatives, then the amide, prior to reaction with a dimeric acid, would be polyfunctional insofar that it would have at least two alcoholic hydroxyl groups as part of its structure. Similarly, if the amide had been treated with glycide or methyl glycide, or if derivatives of glycerylamine or diglycerylamine are employed, one can readily have present two alcoholic hydroxyl groups in the amide, even if acetic acid or butyric acid is employed. For this reason, the reaction product obtained between such polyhydroxylated amide and the dimeric acid may represent a polymer which is resinous in nature, rather than the simpler monomer previously illustrated.

We desire to point out that we are aware of the fact that there are other reactants, which, at first glance, appear to bear a superficial relationship to the reactants herein contemplated. One might assume that such reactants could be employed to produce products comparable to those herein described. We have found the contrary to be true. For instance, we are aware that there are a variety of other high molal dicarboxy acids, such as sebacic acid, analogues of the same, etc. Other classes include dimers of abietic acid, etc. Acetalized ricinoleic acid is an additional example. Diels-Alder and Clocker adducts represent another type, particularly when derived from maleic anhydride, etc. We have not found such particular products could be substituted for the reactants herein described, and particularly, the dimeric acids indicated in detail.

The effectiveness of the compounds herein described for various uses, and particularly demulsification, is undoubtedly related to the surface activity. The usual concept of surface activity, and particularly in regard to the orientation at interface of wetting agents or the like, is concerned with the balance between a hydrophobe and a hydrophile group. Such concept does not appear to lend itself to any particularly satisfactory explanation of compounds of the type herein contemplated, wherein the hydrophobe group is fixed between two hydrophile groups. Naturally, such a molecular structure does not seem to be susceptible to the conventional orientation, where there is one hydrophile and one hydrophobe group in the molecule. This difference is marked by the particular effectiveness as a demulsifier on numerous California emulsions, in comparison with the monopyridine compounds described in various aforementioned patents.

Previous mention has been made of the fact that the second class of reactants herein employed is a hydrohalide of a member of the pyridine series. Such hydrohalides include the hydrochlorides, hydrobromides, etc. Members of the pyridine series suitable as reactants include pyridine, alkylated derivatives of pyridine, particularly alkylated derivatives, in which the alkyl radical contains three carbon atoms or less, and especially methylated pyridines, i. e., pyridines, in which one, two, or three methyl groups have been substituted in the nucleus, such as picolines, lutidines and collidines. Also suitable as reactants are the comparable quinolines and isoquinolines, along with C-methyl homologues thereof. Coal tar bases represent mixtures of suitable heterocyclic materials which may be used as such, or after suitable purification, without separation into the individual components.

The hydroxylated diamides previously described and employed as reactants, vary from viscous to sub-resinous or resinous substances, usually dark amber in color. They show no solubility in water, or at the most, only a slight tendency towards solubility. This is due primarily to the fact that the amino nitrogen atom is not basic and no attempt is made to introduce sufficient alkylene oxide and radicals to give solubility, due to such hydrophile group. The reactions involved between the hydroxylated diamides and a hydrohalide of the pyridine series, may be illustrated in the following manner:

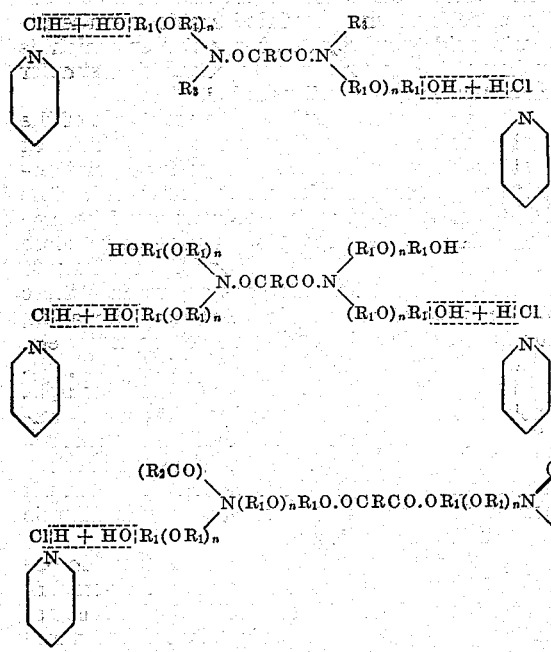

The procedure involved in carrying out the above indicated reactions is entirely comparable to, and operating conditions are the same, as in the manufacture of the monopyridinium compounds described in the various aforementioned patents. The reactions are generally conducted in the presence of an excess of pyridine or the pyridine base. When there is an excess of such base present, the boiling point of the mixture more or less determines the reaction temperature. Time of reaction is comparatively short, two or three hours being sufficient, if there is an excess of pyridine or the pyridine base. The reaction mixture is preferably stirred constantly during reaction, and at the end of the period of reaction, the excess of pyridine or pyridine base is distilled off along with any remaining amount of water. If desired, the convenient procedure is to use a hot condenser, i. e., a condenser so regulated in regard to temperature, that water of reaction is eliminated, but that the pyridine or higher boiling pyridine base is returned to the mixture.

DIPYRIDINIUM COMPOUND
*Example 1*

One pound mole of the hydroxylated diamide described under the heading "Hydroxylated Diamide, Example 1" or "Hydroxylated Diamide, Example 2," is mixed with 2 pound moles of pyridine hydrochloride and 1 pound mole of pyridine for approximately 2 to 3 hours at approximately 150° C., using a hot condenser so as to reflux the pyridine, but permitting water to escape. The reaction mass is stirred constantly during reaction. At the end of the period of reaction, the excess of pyridine and any water present is removed by vacuum distillation, using only a moderate vacuum, and approximately 30–40 mm. of mercury. The resultant product is a dark red solid or pasty, sugary mass, and is completely soluble in water.

DIPYRIDINIUM COMPOUND
*Example 2*

The same procedure is employed, except that instead of the hydroxylated diamide used in the preceding example, one employs instead the hydroxylated diamide described under the heading "Hydroxylated Diamide, Example 3," and which was obtained by treatment with 4 pound moles of ethylene oxide, as herein described.

DIPYRIDINIUM COMPOUND
*Example 3*

The same procedure is followed as in the preceding examples, except that the particular hydroxylated diamide employed is the one described under the heading "Hydroxylated Diamide, Example 5" and obtained by reaction with the dimeric acid with 2 pound moles of diethanolamine.

DIPYRIDINIUM COMPOUND
*Example 4*

The same procedure is employed as in the immediately preceding Example 3, except that one uses the hydroxylated diamide described under the heading "Hydroxylated Diamide, Example 7" in combination with a pyridine hydrochloride and pyridine.

DIPYRIDINIUM COMPOUND
*Example 5*

The same procedure is followed as in the four previous examples, except that instead of using pyridine and pyridine hydrochloride, one employs instead an equivalent amount of the hydrochloride of a fraction of pyridine base, which fraction is characterized by the fact that 50% distils up to 140° C. and 90% distils up to 160° C. and the product is completely water-soluble. This same product in the form of a free base is substituted for the pyridine used in the prior examples.

The new materials or compositions of matter herein described, are useful as wetting, detergent, and leveling agents in the laundry, textile, and dyeing industries; as wetting agents and detergents in the acid washing of fruit, in the acid washing of building stone and brick; road building and the like; as a constituent of soldering flux preparations; as a flotation reagent in the flotation separation of various minerals; for flocculation and coagulation of various aqueous coal washing waste water, and various trade wastes, and the like; as germicides, insecticides, emulsifiers for cosmetics, spray oils, water-repellent textile finish, etc. These uses are by no means exhaustive as far as industrial application goes, although the most important use of our new material is as a demulsifier for water-in-oil emulsions, and more specifically, emulsions of water or brine in crude petroleum.

We have found that the chemical compounds herein described which are particularly desirable for use as demulsifiers, may also be used as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants, in combination with mineral acid for acidization of oil-bearing strata, reference is made to U. S. Patent No. 2,233,383, dated February 24, 1941, to De Groote and Keiser.

The new compounds herein described are of utility, not only for the purposes specifically enumerated in detail, but they also find application in various other industries, processes, and for various uses where wetting agents of the conventional type are used. As to some of such additional uses which are well known, see "The Expanding Application of Wetting Agents," Chemical Industries, volume 48, page 324, (1941).

Another use for the compounds herein contemplated is in the prevention of landslides, as described in U. S. Patent No. 2,348,458, dated May 9, 1944, to Endersby.

It may be well to note that polymerization of polyene acids is not limited to the esters, but that the acids per se may be polymerized. This fact is noted, for example, in the aforementioned Johnston Patent No. 2,347,562.

Having thus described our invention, what we claim as new and desire to secure by Letters Patent is:

A dipyridinium compound, selected from the class consisting of

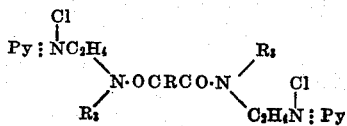

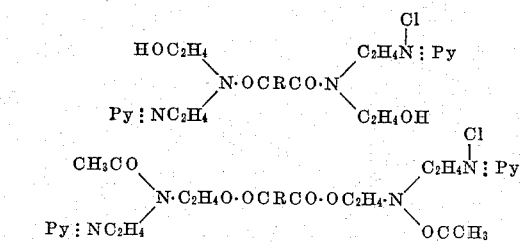

in which OCRCO is the acid radical of

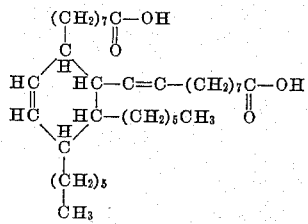

in which Py:N is the pyridinium radical, and in which R₃ is a member of the class consisting of hydrocarbon radicals having not more than seven carbon atoms and hydrogen atoms.

MELVIN DE GROOTE.
BERNHARD KEISER.

REFERENCES CITED

The following references are of record in the file of this patent:

UNITED STATES PATENTS

| Number | Name | Date |
|---|---|---|
| 2,094,609 | Kritchevsky | Oct. 5, 1937 |
| 2,146,408 | Shipp | Feb. 7, 1939 |
| 2,310,873 | Sauer | Feb. 9, 1943 |
| 2,335,262 | De Groote | Nov. 30, 1943 |
| 2,347,562 | Johnston | Apr. 25, 1944 |
| 2,363,504 | De Groote | Nov. 28, 1944 |
| 2,381,115 | De Groote | Aug. 7, 1945 |